US008915165B2

(12) United States Patent
Lee

(10) Patent No.: US 8,915,165 B2
(45) Date of Patent: Dec. 23, 2014

(54) BALANCE ADJUSTMENT DEVICE OF ROTATING BODY AND POWER DELIVERY SYSTEM USING BALANCE ADJUSTMENT DEVICE

(71) Applicant: Hyundai Motor Company, Seoul (KR)

(72) Inventor: Jae Kwon Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 51 days.

(21) Appl. No.: 13/727,088

(22) Filed: Dec. 26, 2012

(65) Prior Publication Data

US 2014/0056689 A1    Feb. 27, 2014

(30) Foreign Application Priority Data

Aug. 22, 2012 (KR) .................. 10-2012-0091848

(51) Int. Cl.
*F16F 15/30* (2006.01)
*F01D 25/00* (2006.01)
*G01M 1/00* (2006.01)

(52) U.S. Cl.
CPC . *F01D 25/00* (2013.01); *G01M 1/00* (2013.01)
USPC ....................................... 74/572.2

(58) Field of Classification Search
USPC ............. 74/572.4, 572.2; 156/75; 73/66, 470; 464/180; 123/192.1, 192.2
See application file for complete search history.

(56) References Cited

U.S. PATENT DOCUMENTS

| 4,059,972 | A | * | 11/1977 | Beam et al. ................. 464/23 |
| 4,220,055 | A | * | 9/1980 | Dubois et al. ............... 464/180 |
| 5,582,077 | A | * | 12/1996 | Agram et al. ................ 464/180 |
| 7,503,238 | B2 | * | 3/2009 | Madden ....................... 74/572.2 |
| 2008/0017157 | A1 | * | 1/2008 | Masuda ....................... 123/192.2 |

FOREIGN PATENT DOCUMENTS

| JP | S57-90203 | 11/1979 |
| JP | 09072386 A | 3/1997 |
| JP | 2006275111 A | 10/2006 |

* cited by examiner

*Primary Examiner* — Vicky Johnson
(74) *Attorney, Agent, or Firm* — Edwards Wildman Palmer LLP; Peter F. Corless

(57) ABSTRACT

Disclosed is a balance adjustment device of a rotating body including a body configured and structured to rotate based on a rotating axis; a fixation protrusion groove formed on the exterior circumference thereof; a balance ring, wherein a fixation protrusion is formed on an interior circumference of the balance ring that corresponds to the exterior circumference of the rotating body to be inserted into the fixation protrusion groove; and a balance weight formed on the balance ring to adjust the rotating balance.

12 Claims, 3 Drawing Sheets

BALANCE ADJUSTMENT DEVICE OF ROTATING BODY AND POWER DELIVERY SYSTEM USING BALANCE ADJUSTMENT DEVICE

CROSS-REFERENCE TO RELATED APPLICATION

This application claims priority to and the benefit of Korean Patent Application No. 10-2012-0091848 filed in the Korean Intellectual Property Office on Aug. 22, 2012, the entire contents of which are incorporated herein by reference.

BACKGROUND OF THE INVENTION (a) Field of the Invention

The present invention relates to a balance adjustment device of a rotating body, and more particularly, to a balance adjustment device of a rotating body that adjusts a rotating balance of a body that rotates based on a rotating axis and a power delivery system using the balance adjustment device.

(b) Description of the Related Art

Generally, the balance of a rotating body must be accurately adjusted to reduce vibration and noise generated when the body rotates and to improve the durability of the rotating body. Accordingly, a rotating portion or a reciprocal motion portion of a vehicle engine is balanced in a static state or a dynamic state to be assembled on the engine.

Moreover, after the engine is assembled, the dynamic unbalance of the engine is increased and the balance is measured again. Recently, a method for compensating the unbalance has been researched.

Additionally, research has been conducted on how to satisfy the dynamic rotating balance of the engine by forming a compensation protrusion at one side of a damper pulley of an engine. However, this method can break the protrusion, and makes it difficult to repeatedly adjust the balance.

The above information disclosed in this section is only for enhancement of understanding of the background of the invention and therefore it may contain information that does not form the prior art that is already known in this country to a person of ordinary skill in the art.

SUMMARY

The present invention provides a balance adjustment device of a rotating body having advantages of easily and repeatedly controlling a rotating unbalance of a damper pulley and securely maintaining the balance during a rotating condition and a power delivery system using the balance adjustment device.

A balance adjustment device of a rotating body according to an exemplary embodiment of the present invention may include a body that rotates based on a rotating axis and a fixation protrusion groove formed on an exterior circumference of the rotating body; a balance ring, wherein a fixation protrusion is formed on an interior circumference of the balance ring, and the interior circumference of the balance ring corresponds to the exterior circumference of the rotating body to be inserted into the fixation protrusion groove; and a balance weight formed on the balance ring to adjust the rotating balance.

The fixation protrusion groove may be opened toward a side surface of the rotating body to move the fixation protrusion in a rotating axis direction to be inserted into the fixation protrusion groove. In addition, the length of the inner side width of the fixation protrusion groove may be longer than the length of the inlet side width thereof. Furthermore, the fixation protrusion may have a shape corresponding to the fixation protrusion groove.

The interior circumference of the balance ring may contact the exterior circumference of the rotating body. Moreover, the balance weight may protrude on the exterior circumference of the balance ring to be integrally formed thereon. The fixation protrusion and the fixation protrusion groove may be formed at uniform intervals in a rotation direction of the rotating body, and the balance weight may be formed with a predetermined rotation angle from the fixation protrusion. In addition, the balance weight may be formed within a predetermined angle range in a rotation direction of the rotating body.

A power transmission system according to an exemplary embodiment of the present invention may include a balance adjustment device of a rotating body and a damper pulley in which the balance adjustment device is formed on a rotation center portion thereof.

Further, a fixation protrusion formed on an interior circumference of the balance ring may be inserted into a fixation protrusion groove formed on an exterior circumference of the hub to securely assemble the balance ring. In addition, a balance weight formed on an exterior circumference of the balance ring may be used to easily adjust the balance.

As described above, a balance adjustment device of a rotating body according to an exemplary embodiment of the present invention may prevent damage to periphery components and may fix a balance ring having a ring shape on an exterior circumference of a hub to maintain safe balance during driving.

DESCRIPTION OF THE EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings.

Figure 1:
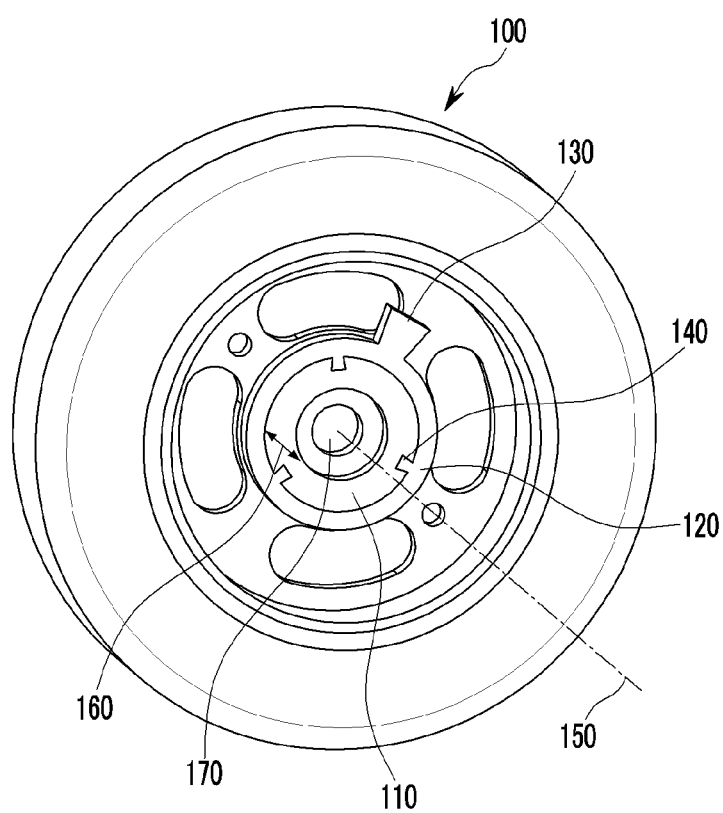
FIG. 1 is an exemplary view of a damper pulley disposed on an engine according to an exemplary embodiment of the present invention.

FIG. 1 is an exemplary view of a damper pulley disposed on an engine according to an exemplary embodiment of the present invention. Referring to FIG. 1, a damper pulley 100 may have a shaft aperture 170 formed at a central portion of the damper pulley, and a hub 110 as a rotating body may be formed near the shaft aperture 170.

A balance ring 120 may be moved in a sideways direction to be mounted on the hub 110. Furthermore, a fixation protrusion 140 that protrudes on an interior circumference of the balance ring 120 toward a rotation axis may be inserted into a fixation protrusion groove 200 formed on an exterior circumference of the hub 110. Further, a balance weight 130 may be formed at one side of an exterior circumference of the balance ring 120 to adjust overall balance. In particular, the balance weight 130 may be integrally formed with the balance ring 120 at a predetermined rotation interval with the fixation protrusion 140.

Figure 2:
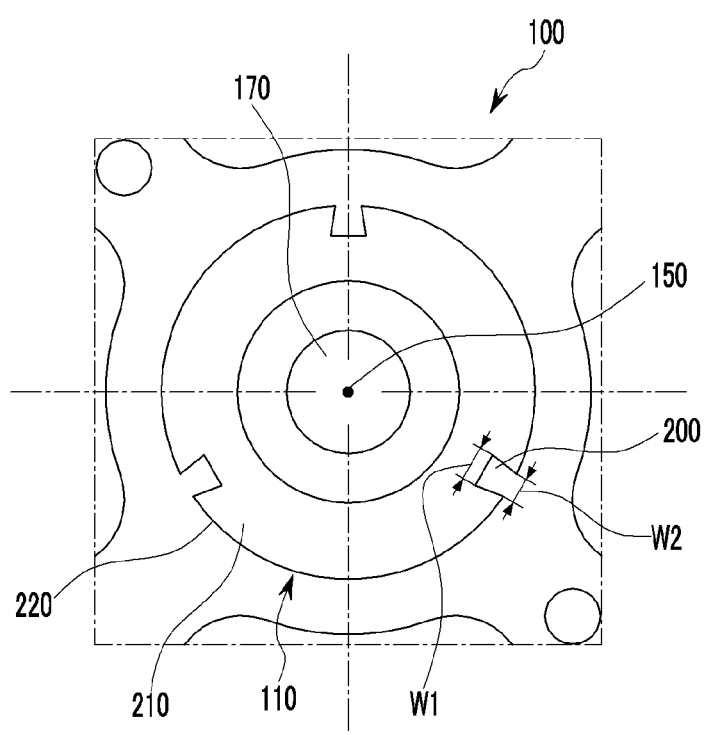
FIG. 2 is an exemplary front view of a hub formed on a damper pulley disposed on an engine according to an exemplary embodiment of the present invention.

Hereinafter, referring to FIG. 2 and FIG. 3, the structure of the hub 110 and the balance ring 120 will be described in detail. FIG. 2 is an exemplary front view of a hub formed on a damper pulley disposed on an engine according to an exemplary embodiment of the present invention.

Referring to FIG. 2, an exterior circumference 220 having an equal distance from a rotating axis 150 of a central portion may be formed on the hub 110 and a fixation protrusion groove 200 may be formed on the exterior circumference 220 at a predetermined angle (e.g., 120 degrees).

The protrusion groove 200 may be opened in a sideways direction of the hub 110. Accordingly, the balance ring 120 may be moved in a sideways direction 160 parallel to the rotation shaft 150 to be engaged with the hub 110. This description is an exemplary embodiment of the present invention, and the interval and the number of the fixation protrusion groove 200 is not limited thereto.

The fixation protrusion groove 200 may include an inlet width W2 formed to correspond to the exterior circumference 220 and a bottom width W1 formed on an interior bottom, and the length of the bottom width W1 may be longer than the length of the inlet width W2. In other words, the fixation protrusion groove 200 may be a symmetrical rhombus shape of which a lower side is wider than an upper side.

Figure 3:
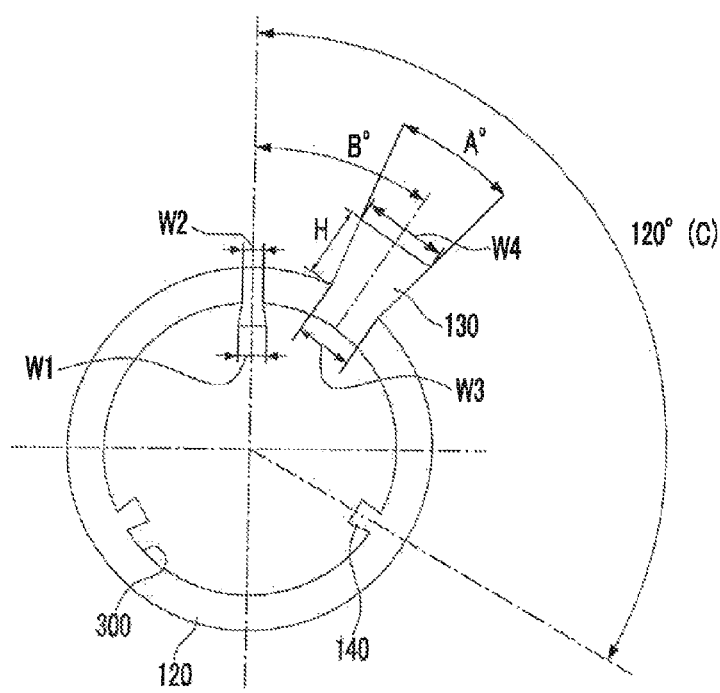
FIG. 3 is an exemplary front view of a balance ring mounted on a hub and formed on a hub disposed on an engine according to an exemplary embodiment of the present invention.

FIG. 3 is an exemplary front view of a balance ring mounted on a hub and formed on a hub disposed on an engine according to an exemplary embodiment of the present invention. Referring to FIG. 3, the balance ring 120 may have an interior circumference 300 corresponding to the exterior circumference 220 of the hub 110, a fixation protrusion 140 may be formed on the interior circumference 300 to correspond to the fixation protrusion groove 200, and the fixation protrusion 140 may be arranged in a circumference direction at a predetermined angle (C).

The fixation protrusion 140 may have a symmetrical rhombus shape to correspond to the fixation protrusion groove 200 and may be arranged with a rotation interval of 120 degrees.

The balance weight 130 may be formed on an exterior circumference of the balance ring 120, and the balance weight 130 may be formed with a predetermined angle (B) from the fixation protrusion 140. The predetermined angle (B) may be varied depending on the design specification. Furthermore, the balance weight 130 may be formed in a predetermined angle (A) range in a rotating direction of the balance ring 120.

The weight of the balance weight 130 may be varied by increasing the angle (A) range. In addition, the weight of the balance weight 130 may be varied by changing a protrusion height (H) of the balance weight 130.

As shown in the drawings, the length of a width W3 of a connection part connected to the balance ring 120 may be shorter than that of a width W4 of an end part formed at an end portion of the balance weight 130. In other words, the balance weight 130 may have a fan shape and the width of the balance weight may increase as the distance from the balance weight to the rotation axis 150 increases.

When the balance ring 120 is moved in a sideways direction 160 to be mounted on the hub 110, the interior circumference 300 of the balance ring 120 may be forcibly inserted into the exterior circumference 220 of the hub 110. Further, the fixation protrusion 140 of the balance ring 120 may be forcibly inserted into the fixation protrusion groove 200.

In an exemplary embodiment of the present invention, the overall balance may be measured while rotating the hub 110 and the damper pulley 100 and the balance ring 120 may be mounted on the hub 110 depending on the measured result. In particular, the mounting angle of the balance ring 120 and the weight of the balance weight 130 formed on the balance ring 120 may be adjusted according to the characteristics of the measured balance.

Further, the fixation protrusion 140 to be inserted into the fixation protrusion groove 200 may be eliminated to further increase the balance adjustment accuracy. A balance adjustment device of a rotating body according to an exemplary embodiment of the present invention may prevent damage to periphery components compared to a method for breaking the fixation protrusion through an impact, according to the conventional art. In addition, a balance ring 120 having a ring shape may be forcibly mounted into an exterior circumference of a hub 110 to maintain safe balance during driving.

Further, a fixation protrusion 140 formed on an interior circumference of the balance ring 120 may be forcibly inserted into a fixation protrusion groove 200 formed on an exterior circumference of the hub 110 to securely assemble the balance ring 120. In addition, a balance weight 130 formed on an exterior circumference of the balance ring 120 may be used to easily adjust the balance.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A balance adjustment device, comprising:
   a body configured and structured to rotate based on a rotating axis;
   a fixation protrusion groove formed on an exterior circumference of the body;
   a balance ring, wherein a fixation protrusion is formed on an interior circumference of the balance ring that corresponds to the exterior circumference of the body to be inserted into the fixation protrusion groove; and
   a balance weight formed on the balance ring to adjust the rotating balance,
   wherein the length of an inner side width of the fixation protrusion groove is longer than the length of an inlet side width of the fixation protrusion groove.

2. The balance adjustment device of claim 1, wherein the fixation protrusion groove is opened to a side surface of the body to move the fixation protrusion in a rotating axis direction to be inserted into the fixation protrusion groove.

3. The balance adjustment device of claim 2, wherein the interior circumference of the balance ring contacts the exterior circumference of the body and the fixation protrusion has a shape corresponding to the fixation protrusion groove.

4. The balance adjustment device of claim 1, wherein the balance weight protrudes on the exterior circumference of the balance ring to be integrally formed on the balance ring.

5. The balance adjustment device of claim 1, wherein the fixation protrusion and the fixation protrusion groove are formed in plural at uniform intervals in a rotation direction of the body, and the balance weight is formed with a predetermined rotation angle from the fixation protrusion.

6. The balance adjustment device of claim 5, wherein the balance weight is formed within a predetermined angle range in a rotation direction of the rotating body.

7. A power transmission system, comprising:
   a balance adjustment device including:
      a body configured and structured to rotate based on a rotating axis;
      a fixation protrusion groove formed on an exterior circumference of the body;
      a balance ring, wherein a fixation protrusion is formed on an interior circumference of the balance ring that corresponds to the exterior circumference of the body to be inserted into the fixation protrusion groove; and
      a balance weight formed on the balance ring to adjust the rotating balance, wherein the length of an inner side width of the fixation protrusion groove is longer than the length of an inlet side width of the fixation protrusion groove; and
   a damper pulley in which the balance adjustment device is formed on a rotation center portion of the damper pulley.

8. The power transmission system of claim 7, wherein the fixation protrusion groove is opened to a side surface of the body to move the fixation protrusion in a rotating axis direction to be inserted into the fixation protrusion groove.

9. The power transmission system of claim 8, wherein the interior circumference of the balance ring contacts the exterior circumference of the body and the fixation protrusion has a shape corresponding to the fixation protrusion groove.

10. The power transmission system of claim 7, wherein the balance weight protrudes on the exterior circumference of the balance ring to be integrally formed on the balance ring.

11. The power transmission system of claim 7, wherein the fixation protrusion and the fixation protrusion groove are formed in plural at uniform intervals in a rotation direction of the body, and the balance weight is formed with a predetermined rotation angle from the fixation protrusion.

12. The power transmission system of claim 11, wherein the balance weight is formed within a predetermined angle range in a rotation direction of the body.

\* \* \* \* \*